Figure 1:
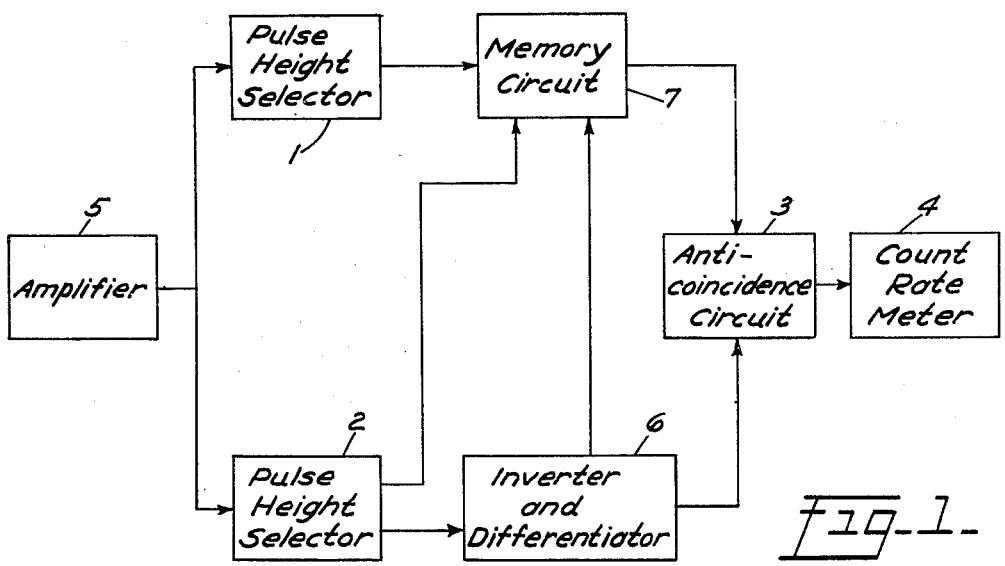

Aug. 21, 1956     P. R. BELL     2,760,064
PULSE ANALYZER

Filed Feb. 11, 1952     3 Sheets—Sheet 1

INVENTOR
Persa R. Bell
BY
Roland A. Anderson
ATTORNEY

Aug. 21, 1956  P. R. BELL  2,760,064
PULSE ANALYZER
Filed Feb. 11, 1952  3 Sheets-Sheet 2

INVENTOR
Persa R. Bell
BY
Roland A. Anderson
ATTORNEY

Aug. 21, 1956  P. R. BELL  2,760,064
PULSE ANALYZER

Filed Feb. 11, 1952   3 Sheets-Sheet 3

INVENTOR
Persa R. Bell
BY
Roland A. Anderson
ATTORNEY

United States Patent Office

2,760,064
Patented Aug. 21, 1956

2,760,064

PULSE ANALYZER

Persa R. Bell, Oak Ridge, Tenn., assignor to the United States of America as represented by the United States Atomic Energy Commission Application February 11, 1952, Serial No. 271,045

8 Claims. (Cl. 250—27)

My invention relates to pulse height distribution analyzers and more particularly to a single channel analyzer built for measuring the pulse spectrum from proportional and scintillation counters.

The pulse-height distribution of a counter may be obtained by using a single pulse-height selector to count all pulses above a given amplitude determined by the bias setting of the selector. There are disadvantages to this method. For instance, if the number of pulses above the value E is counted for a fixed time to obtain the value $n_1$, after which the setting of the pulse-height selector is changed to count all pulses above $E+\Delta E$ to obtain the value $n_2$. Then the number of pulses lying in the interval $\Delta E$ is given by $(n_1-n_2)$ with a statistical error of $(n_1+n_2)^{1/2}$. In addition to the statistical error there is also the error introduced by adjusting the dial setting of the pulse-height selector. If the dial can be set accurately to 0.1 percent and a $\Delta E$ of 1 percent is used, then the error in the value $\Delta E$ can be as large as ±20 percent.

The errors can be reduced with an instrument which can measure the number of pulses above E and the number of pulses above $E+\Delta E$ simultaneously and subtract automatically. The statistical error would be immediately reduced to $\pm(n_1-n_2)^{1/2}$ and the counting time would be greatly reduced for the same statistical error. One way of doing this is to employ two pulse-height selectors in a circuit, one biased to trigger when the pulses are above E, and the other biased to trigger when the pulses are above $E+\Delta E$. If the output signals from these two pulse-height selectors are placed in anticoincidence, there should be a signal from the anticoincidence circuit only when the pulse lies in the interval $\Delta E$. This would be true if the pulses had the same duration in the two pulse-height selectors. However, because of the finite rise and fall time of the pulses, the pulse enters the upper pulse-height selector after it has entered the lower one and leaves the upper pulse-height selector before it has left the lower one. This causes an anticoincidence pulse to appear sometimes when there is actually a coincidence. It is insufficient to lengthen the pulse from the upper pulse-height selector and delay the pulse from the lower pulse-height selector. When this is done, the lower pulse-height selector recovers before the upper pulse-height selector. It is then possible to have a large pulse enter which should trigger both selectors but triggers only the lower one, because the upper one has not yet recovered. This causes a false anticoincidence.

Applicant with a knowledge of these problems of the prior art has for an object of his invention the provision of a pulse-height distribution analyzer arranged to suppress the output signal from the anticoincidence circuit until it is determined whether signals will result in coincidence.

Applicant has as another object of his invention the provision of a differential-integral pulse-height analyzer which reduces to a minimum or eliminates the need for periodic adjustment.

Applicant has as another object of his invention the provision of a differential-integral pulse-height analyzer which overcomes the problem of anticoincidence circuitry introduced by channels having different response times without increasing the dead time of the system.

Applicant has as a further object of his invention the provision of a differential-integral pulse-height analyzer which will respond to various forms of driving pulses and where pulse shape is not critical to the operation of the system within the speed limitations of the circuitry.

Applicant has as a further object of his invention the provision of a pulse-height distribution analyzer whose operation is not adversely effected by the finite rise and fall time of the pulses.

Other objects and advantages of my invention will appear from the following specification and accompanying drawings, and the novel features thereof will be particularly pointed out in the annexed claims.

Figure 3:
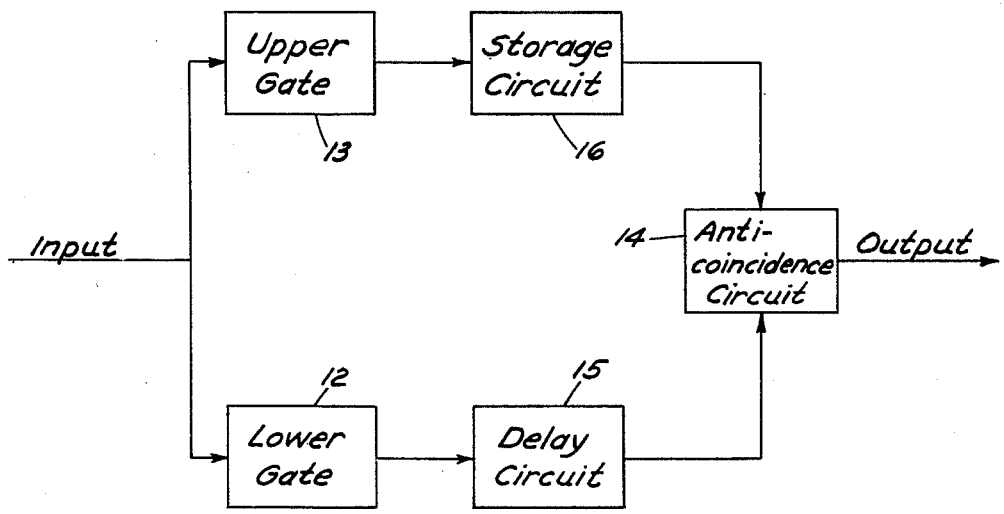
Figure 2:
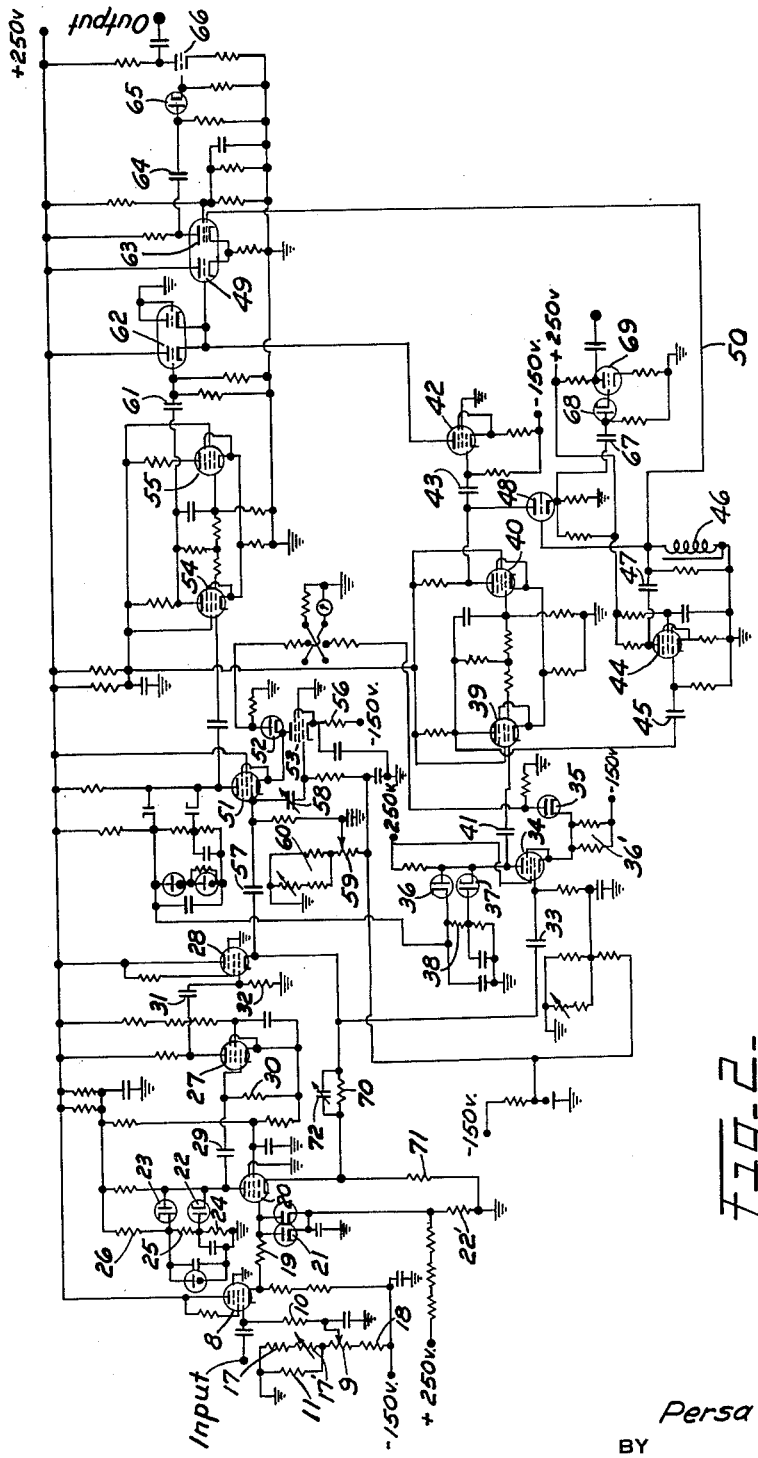
Figure 4:
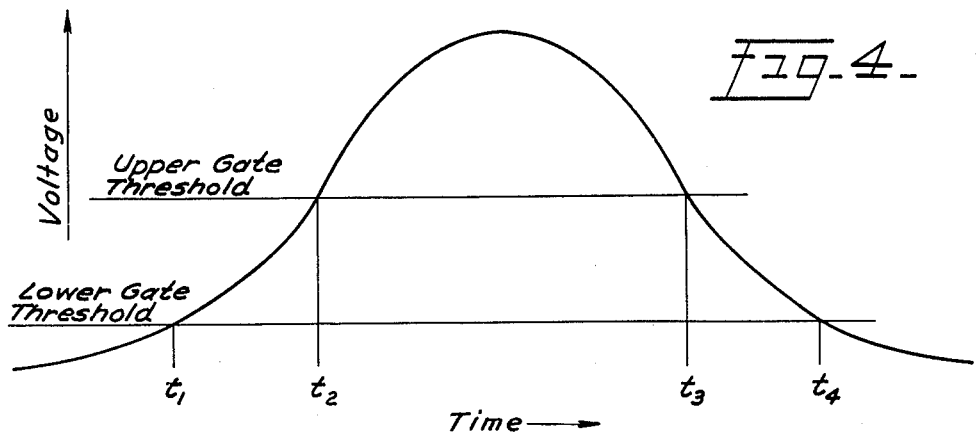
Figure 5:
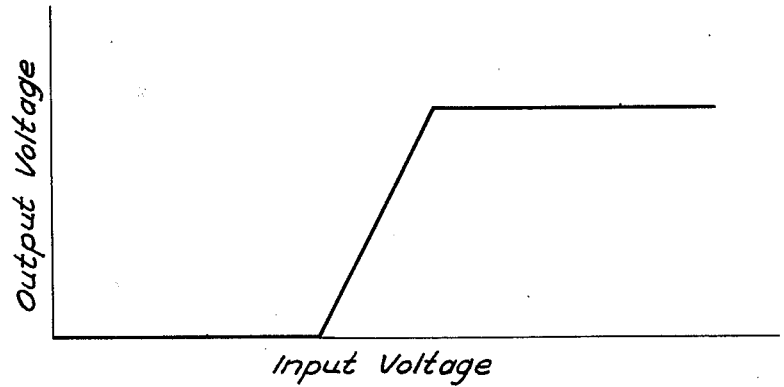

In the drawings, Fig. 1 is a block diagram of my improved pulse-height distribution analyzer. Fig. 2 is a circuit diagram of one form of my improved pulse-height distribution analyzer. Fig. 3 is a block diagram of the basic elements of my improved pulse-height analyzer incorporating the principles of my invention. Fig. 4 is a graph showing an exaggerated pulse and including the differences in the times of operation of the gates of Fig. 3. Fig. 5 is a graph of input voltage plotted against output voltage of the pulse-height selecting amplifier.

Referring to the basic circuit of Fig. 3, 12 designates the lower gate and 13 represents the upper one. The upper gate is set to operate on pulses of greater magnitude than those required to operate the lower one. The spread between the two gates represents the slit through which the pulses may pass. These gates feed into an anticoincidence circuit 14 so that pulses large enough to be passed by both gates 12 and 13 will cancel out in the anticoincidence circuit and no driving pulse will be passed thereby. Pulses sufficiently large to pass through the lower gate 12 but not large enough to reach the threshold of the upper gate 13 will be rejected by it. These pulses which only pass through the lower channel will likewise be passed by the anticoincidence circuit for counting. Thus pulses falling within the voltage range between the thresholds of gates 12 and 13 will go through the slit and be counted.

However, for systems with anticoincidence circuits which are to operate at the higher counting rates, because of the finite rise and fall time of the signal at the input, the lower gate 12 is triggered before the upper gate 13, and the upper gate 13 is also restored to the ground state before the lower gate 12. This is illustrated in Fig. 4 where the lower gate 12 may operate at time $t_1$ while the upper gate 13 is not operated until time $t_2$. Then at time $t_3$ the upper gate 13 is restored and finally at time $t_4$ the lower gate 12 is restored. This may adversely effect the operation of the anticoincidence circuit due to the fact that the operating time of the two gates does not coincide. Thus it is seen that the inhibiting signal for the anticoincidence circuit must continue at least as long as the driving or inquiring signal since the overlap would permit the driving signal to pass through the anticoincidence circuit and register a count. This has been overcome by delaying the signal from the lower gate 12 with a delay circuit 15 until the upper gate 13 has been triggered, and to store the signal from the upper gate 13 in a storage circuit 16 until the lower gate 12 has recovered.

Referring now to the block diagram of Fig. 1, the upper and lower gates of pulse-height selectors are designated respectively, 1 and 2. They feed into an anticoincidence circuit 3 connected to a count rate meter 4, and are fed by an amplifier 5. Gate 2 is coupled to an inverter-differentiator which controls the operation of a storage or memory circuit 7.

As indicated, the analyzer is designed to operate on the pulses from a linear amplifier 5 of the type described by Jordan and Bell in vol. 17 of Review of Scientific Instruments, page 703 (1947). When this amplifier is to be used on the wide band width, a delay line differentiator is incorporated in it to make the pulses relatively flat on top. Because the amplifier gives pulses ranging from zero to only ninety volts and because it is easier to distinguish pulses of different sizes if the difference is large, it appeared desirable to increase the spread in the distribution of pulse sizes by further amplification. Further amplification also decreases the effects of any small drifts which might occur in the biases of the analyzer. To do this an amplifier must meet certain rigid requirements. It must have good gain stability and not overload in an undesirable manner. The band width must be kept as wide as possible. When the amplifier is amplifying all of a small pulse, the pulse has the frequency spectrum of the previous amplifier. When the amplifier is amplifying only the top few percent of a large pulse, the pulse has components of higher frequency in addition to the frequency spectrum of the previous amplifier.

The pulse-height selecting amplifier 5 amplifies a segment of the pulse distribution as indicated in Fig. 5. A potentiometer or "helipot," described more in detail hereinafter, at the input of the amplifier determines which segment is amplified and thus sets the minimum value that a pulse must have to give an output signal.

The lower pulse-height selector or gate 2 is biased to trigger on very small pulses from the amplifier 5. Two output signals are taken from this gate. One is used to actuate or turn on the memory or storage circuit 7. The other is differentiated from a shorted delay line to produce two pulses. The pulse marking the end of the input pulse to the gate 2 is used to hold on the memory circuit and is also fed to the anticoincidence circuit.

The upper pulse-height selector or gate 1 is triggered only if the output pulse from the amplifier 5 is above a certain value. The output pulse from this selector is fed to the memory or storage circuit 7. The difference between the size of the pulse which triggers the lower gate 2 and the size of the pulse which triggers the upper gate 1 determines ΔE, or the window width. The memory or storage circuit 7 puts a signal on the anticoincidence circuit 3, provided the upper gate 1 is triggered. The signal to the anticoincidence circuit 3 lasts until after the differentiated pulse from the lower gate 2 has reached the anticoincidence circuit 3. When only the lower gate 2 is triggered, there is no coincidence, and there is an output pulse fed from the coincidence circuit 3 to the count rate meter 4.

Referring to the circuit of Fig. 2 the first tube 8 forms part of the amplifier and acts as a cathode follower. The control grid bias thereof may be varied over a wide range, preferably of about 100 volts by means of a potentiometer or "helipot" 9 of about 15 turns. The moving contact of the "helipot" is coupled through grid resistor 10 to the grid. The "helipot" is connected through a resistor network 11, 17, 17' and 18 from −150 volts to ground. The variable resistor 17' is a zero adjustment for potentiometer 9. The output of the cathode follower 8 is fed through limiting resistor 19 to the control grid of the second tube 20 of the amplifier. The tube 8 draws plate current at all times so that it operates in a linear manner. This allows D. C. levels of an input pulse to be varied over a range of about 100 volts. An input pulse must be larger than a certain amount, determined by the bias on tube 8, before tube 20 gives an output pulse. The control grid of tube 20 has a twin diode 21 bridged across it to ground through resistor 22'. The twin diode 21, preferably of the 6AL5 type, starts to conduct after the grid has reached a certain value. Two diodes 22, 23 are bridged across the plate of tube 20 and the voltage divider network 24, 25 and 26. These two diodes are biased 10 volts apart. The upper diode 23 by conducting prevents an output signal from appearing until tube 20 is on the linear portion of its characteristic. The lower diode 22 by conducting limits the size of the input pulse so that the tubes which follow it are not overloaded. Since the control grid of the tube 27 is not driven too far negative, the recovery time is shortened. Tube 20 is cascaded with tubes 27 and 28 using conventional resistance-capacitance coupling 29, 30, 31 and 32. Tubes 20, 27 and 28 form a conventional feedback loop with preferably a nominal gain of one thousand and a feedback gain of ten. Resistors 70, 71 and capacitor 72 comprise the feedback network which determines the amplifier gain and frequency response.

The signal from this amplifier is fed into the two gates or pulse-height selectors. This is accomplished in the case of the lower gate by a coupling condenser 33 which serves to couple the cathode of tube 28 to a cathode coupled amplifier comprised of a pentode 34 and diode 35 with a pair of diodes 36, 37 bridging the plate of tube 34 and a voltage divider network 38 which is itself connected from B+ to ground. The input feeds into condenser 33 to the control grid of tube 34, while the cathodes of tubes 34, 35 are tied together and connected through parallel resistor network 36' to a source of high negative potential. This cathode coupled amplifier feeds into a univibrator comprised of tubes 39, 40, the coupling being accomplished with a condenser 41 bridging the plate of tube 34 and the control grid of tube 39. The univibrator is biased so that it fires on very small pulses, with a pulse being taken from each plate of the univibrator. In this arrangement, diode 36 insures that tube 34 is operating on the linear portion of its characteristic curve before it is permitted to pass any output signal, and diode 37 limits the output voltages from tube 34 which shortens the recovery time of the signal that passes through such tube. This in turn hastens the recovery of the univibrator 39, 40, and reduces over-all dead time of the circuit. The signal or pulse taken from tube 40 is fed to the control grid of tube 42 through the coupling condenser 43, while the signal from tube 39 is fed to the control grid of amplifier or inverter 44 through the coupling condenser 45. The pulse from the tube 44 is employed to actuate or turn on the memory or storage circuit by cutting off or rendering inoperative the tube 42. The pulse taken from the plate of the tube 39 after passing through the amplifier 44 is coupled to a shorted delay line 46 by a coupling condenser 47, and is differentiated by it to obtain two pulses corresponding to the leading and trailing edges of the pulses fed thereto. No use is made of the first pulse. The pulse marking the end of the input pulse is used to hold the memory or storage circuit on by turning on or rendering operative tube 48, since the delay line 46 is directly coupled to the control grid thereof. The output pulses from the delay line 46 are likewise fed to the control grid of the second tube 63 of the anticoincidence circuit. This takes place through line 50.

The upper gate or pulse-height selector includes tubes 51, 52, 53, 54 and 55 and is similar to the lower one. Tube 53 is a constant current tube, and is used to compensate for the grid to cathode capacity of tube 51. The cathode plate circuit of tube 53 is connected in series with resistor 56 and the common cathode circuit of tubes 51 and 52. The grid circuit of tube 53 is then coupled through variable condenser 58 to the control grid of tube 51 which is, in turn, coupled to the cathode of cathode follower 28 through condenser 57. The upper gate or pulse-height selector fires only if the pulse is above a certain value determined by the bias on the control grid of tube 51, which is controlled by "helipot" or potentiometer 59 and the resistance network 60, bridged between −150 volts and ground. The magnitude of the bias fixes the ΔE or "window width" of the analyzer. The output pulse of the tube 55 of the upper univibrator passes through coupling condenser 61 to the control grid of the first section of duotriode 62, and then to the first tube 49 of the anticoincidence circuit. The duotriode 62 along with tube 42 comprises the memory circuit.

The memory circuit controls the input of the first anticoincidence tube 49. Normally when there is no input pulse to the circuit, the grid potential of the first anticoincidence tube 49 is held down by current flowing through the circuit including tubes 62, 42 from ground. When a pulse from the lower gate turns off tube 42, the grid of the first anticoincidence tube 49 is left floating and the potential stays at approximately the same level. If, however, the upper gate also fires, a pulse is put on the grid of the first section of tube 62 which pulls the grid potential of the first anticoincidence tube 49 up. The grid potential of tube 49 will stay up preventing any output from the anticoincidence circuit. The potential will not come down until after the differentiated pulse from the lower pulse-height selector has disappeared from the grid of tube 42. When there is no longer a pulse on the grid of tube 42, the tube commences to conduct and resets the memory or storage circuit to again block tube 49 of the anticoincidence circuit. Accordingly if the upper pulse-height selector fires, the memory or storage circuit provides one input to the anticoincidence circuit until after the differentiated pulse from the lower pulse-height selector has entered the anticoincidence circuit. When only the lower gate or pulse-height selector fires there is no anticoincidence, and there is an output pulse which passes from the plate of the tube 63 through the coupling condenser 64 and diode 65 to the grid of triode 66 where it is lengthened and amplified before it is fed to the recording circuit where it may be utilized to drive a scaler.

The memory or storage circuit is necessary because the pulse which the upper pulse-height selector sees is of shorter duration and occurs after the pulse has entered the lower pulse-height selector. Without the memory circuit it is possible to get an anticoincidence when there is actually a coincidence.

The pulse which marks the end of the input pulse from the lower gate is also taken from the cathode of tube 48, passed through coupling condenser 67, lengthened by diode 68, and amplified by tube 69.

Having thus described my invention, I claim:

1. A pulse analyzer for determining pulse-height distribution comprising a plurality of channels for passing pulses, pulse-height discriminators having different acceptance values interposed in said channels to pass pulses of different magnitude, means for storing pulses in the channel having the discriminator with the higher acceptance value, a delay line for differentiating pulses of the channel with a discriminator of lower acceptance value to provide signals corresponding to the leading and trailing edges of the pulses, and an anticoincidence circuit fed by said channels for passing the signals from the trailing edge of the pulse when no pulse is present in the storage circuit.

2. A pulse analyzer for determining pulse-height distribution comprising a pair of channels fed from a common signal source, a pulse shaping discriminator in each channel responsive to pulses above a predetermined magnitude, the discriminator in one channel having a higher signal acceptance value than the discriminator in the other channel, a memory circuit fed by the discriminator in said first named channel, a delay circuit for differentiating the pulses passing through the other channel, means responsive to signals from the discriminator of said other channel and said delay circuit for controlling the operation of the memory circuit, and an anticoincidence circuit for combining the pulses from said channels in opposition.

3. A pulse analyzer for determining pulse-height distribution comprising a pair of channels fed from a common signal source, a gate in each of the channels for passing pulses above a predetermined magnitude, the gate in one of said channels having a higher signal acceptance value than the gate in the other of said channels, a memory circuit in said first named channel, an anticoincidence circuit, means for differentiating the signals from the other of said channels and applying the differentiated signals to the anticoincidence circuit, a circuit for applying signals from the other of said channels to said memory circuit for rendering it operative, a circuit for coupling the differentiating means to the memory circuit for utilizing differentiated signals to sustain its operation, and means for coupling the first of said channels to said anticoincidence circuit for combining in opposition the pulses therefrom with the pulses from the other of said channels.

4. A pulse analyzer for determining pulse-height distribution comprising a pair of channels fed from a single source, a pulse-height selector positioned in each of said channels, one of said pulse-height selectors having a lower acceptance value than the other, a memory circuit positioned in one of the channels beyond the pulse-height selector having the higher acceptance value, means for coupling the other pulse-height selector to said memory circuit to turn it on for storing signals from the first named pulse-height selector, a delay line fed by said other pulse-height selector for differentiating the pulses passing therethrough, means for coupling said delay line to said memory circuit to sustain its operation, and an anticoincidence circuit for coupling the two channels.

5. A pulse analyzer for determining pulse-height distribution comprising an upper and a lower channel fed from a single source, a pulse-height selector for each channel, the selector in the upper channel having a pulse-height acceptance value greater than that in the lower channel, an anticoincidence circuit for coupling said channels, said anticoincidence circuit including a pair of discharge devices corresponding to the upper and lower channels, a memory circuit for coupling one of said discharge devices to the upper channel for normally maintaining it in a low state of operation, and a circuit for coupling the pulse-height selector of the lower channel to the memory circuit and responsive to the operation thereof for rendering the memory circuit ineffective for controlling the state of operation of said last named discharge device.

6. A pulse analyzer for determining pulse-height distribution comprising an upper and a lower channel fed from a common source, a pulse-height selector in each channel, the pulse-height selector in the upper channel having a higher acceptance value than the other one, a memory circuit in said upper channel and fed by the pulse-height selector thereof, an anticoincidence circuit coupled to and fed from the outputs of said channels, said anticoincidence circuit including a pair of grid controlled electric discharge devices, said memory circuit serving to couple one of the discharge devices to the upper channel for normally maintaining a bias on its grid and limiting its conduction, and means for coupling the other pulse-height selector to said memory circuit for controlling its operation when there is a pulse in the lower channel to remove the bias from said grid and permit the operation of the discharge device to pass the pulse for counting.

7. A pulse analyzer for determining pulse height distribution comprising a pair of channels for passing pulses, pulse height discriminators positioned in the channels, said discriminators having different pulse height acceptance values, means fed by one of said discriminators for storing pulses, a circuit fed by the other of said discriminators for disabling the storage means, means fed by the other of said discriminators for delaying the pulses, and an anti-coincidence circuit for combining the pulses from said discriminators in opposition.

8. A pulse analyzer for determining pulse height distribution comprising a pair of channels for passing pulses, a pulse height discriminator interposed in each of said channels, the pulse height discriminator of one of said channels having a higher pulse acceptance value than the pulse height discriminator for the other of said channels, means fed by the discriminator having the lower acceptance value for delaying the pulses, means fed by the discriminator with the higher acceptance value for storing pulses, a circuit responsive to signals from the discriminator having the lower acceptance value for removing the stored pulse from said storing means, and an anti-coincidence circuit for combining the pulses from said channels in opposition.

References Cited in the file of this patent

UNITED STATES PATENTS

| | | | |
|---|---|---|---|
| 2,266,401 | Reeves | Dec. 16, | 1941 |
| 2,459,046 | Rieke | Jan. 11, | 1949 |
| 2,529,666 | Sands | Nov. 14, | 1950 |
| 2,551,529 | Davis et al. | May 1, | 1951 |
| 2,563,245 | Jofeh | Aug. 7, | 1951 |
| 2,577,475 | Miller | Dec. 4, | 1951 |
| 2,694,146 | Fairstein | Nov. 9, | 1954 |